United States Patent [19]

Clark et al.

[11] Patent Number: 5,129,571
[45] Date of Patent: Jul. 14, 1992

[54] MANUFACTURE OF METAL TUBES

[75] Inventors: Jack Clark, Eastleigh; Patrick B. Ryan, Limbe, both of England

[73] Assignee: Pirelli General plc, London, England

[21] Appl. No.: 683,781

[22] Filed: Apr. 11, 1991

[30] Foreign Application Priority Data

Apr. 18, 1990 [GB] United Kingdom ............. 9008659.6

[51] Int. Cl.$^5$ .......................................... B23K 20/12
[52] U.S. Cl. ........................................ 228/112; 228/114; 228/147; 228/148; 228/156; 228/2; 228/9; 228/102
[58] Field of Search ..................... 228/173.7, 102, 112, 228/114, 147, 148, 156, 2, 9, 17.5

[56] References Cited

U.S. PATENT DOCUMENTS

| | | | |
|---|---|---|---|
| 2,032,271 | 2/1936 | Enghauser | 228/114 |
| 3,949,896 | 4/1976 | Luc | 228/112 |
| 4,144,110 | 3/1979 | Luc | 228/112 |

Primary Examiner—Samuel M. Heinrich
Attorney, Agent, or Firm—Brooks Haidt Haffner & Delahunty

[57] ABSTRACT

An apparatus for forming metal tubes is shown in which a metal strip 2 is passed through the apparatus and is formed by a combination of rollers 17, 17', 19, and dies 15, 24 into a shape defining a tube. Prior to the completion of the formation of the metal strip 2 into a shape defining a tube, a brazing wire 1 is supplied through rollers 8 onto the metal strip 2 between two edge portions thereof to be bonded together. The edge portions are bonded together by means of a frictional wheel 27 rotating at high speed.

28 Claims, 6 Drawing Sheets

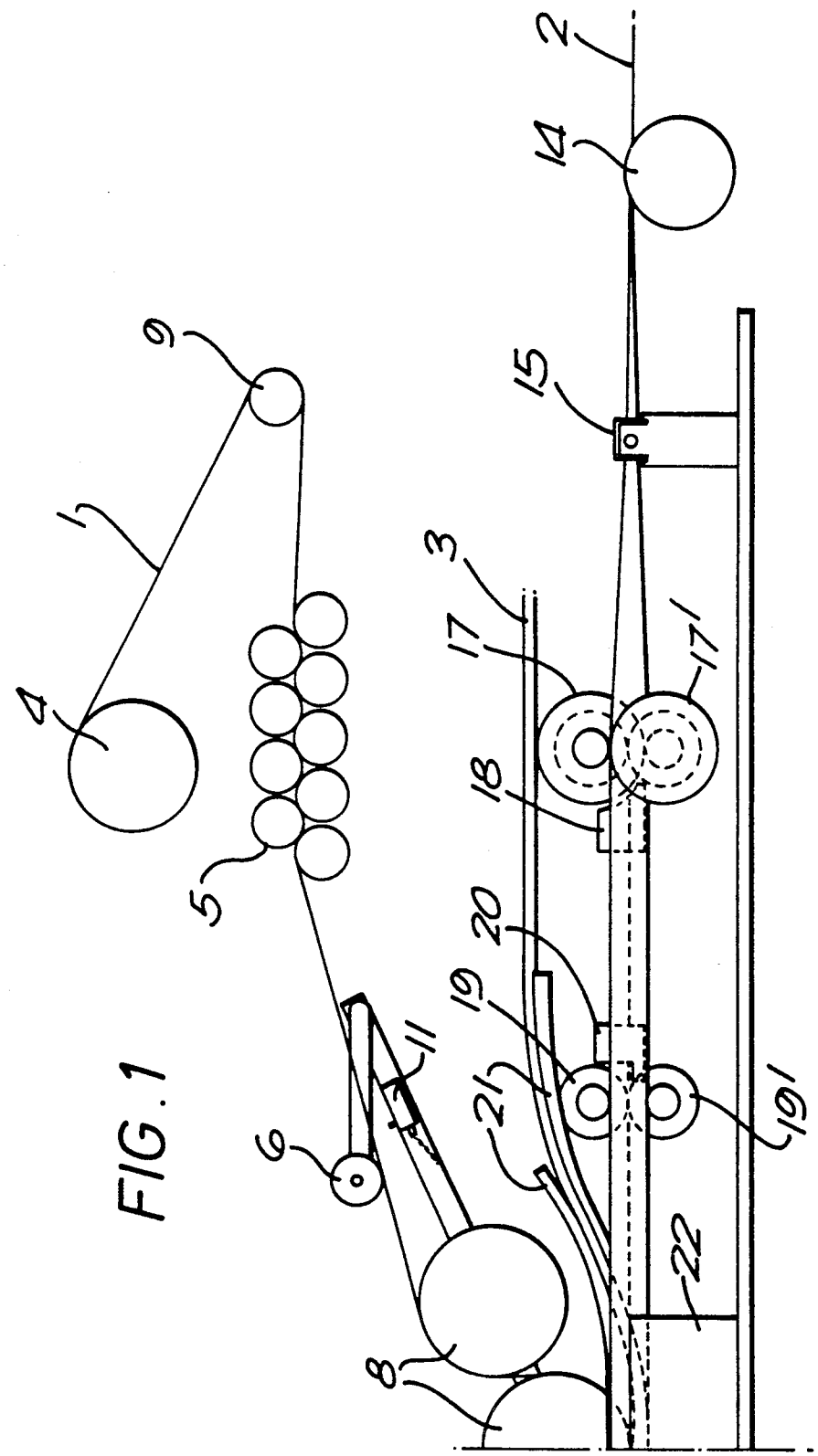

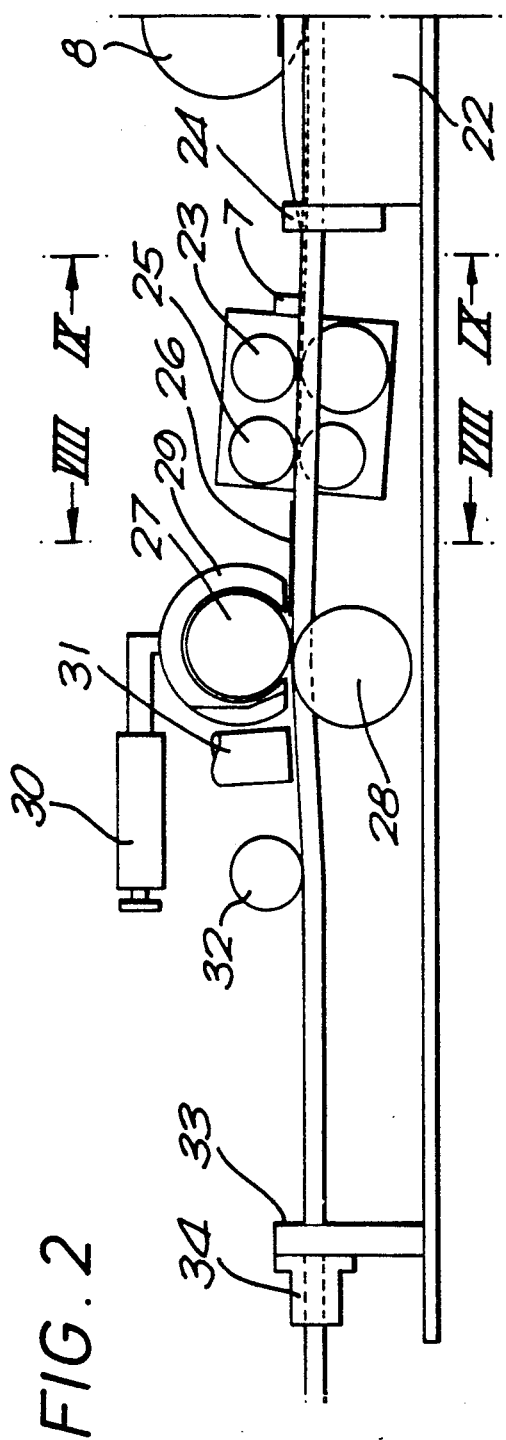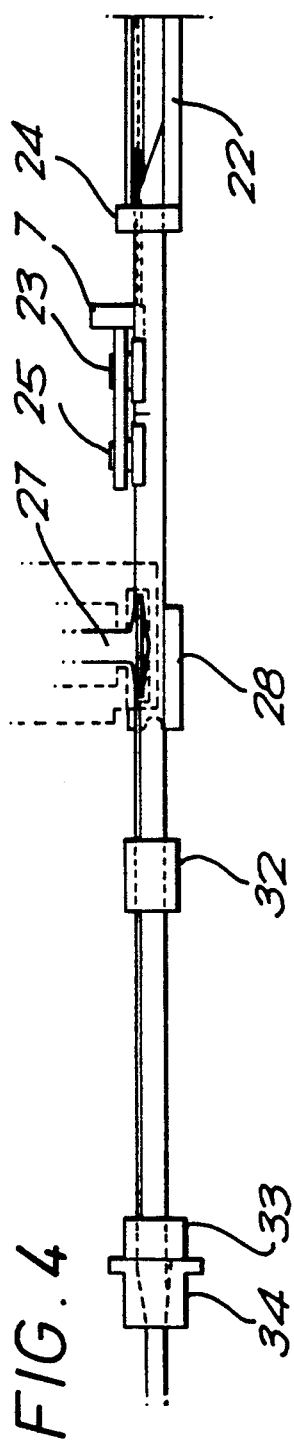

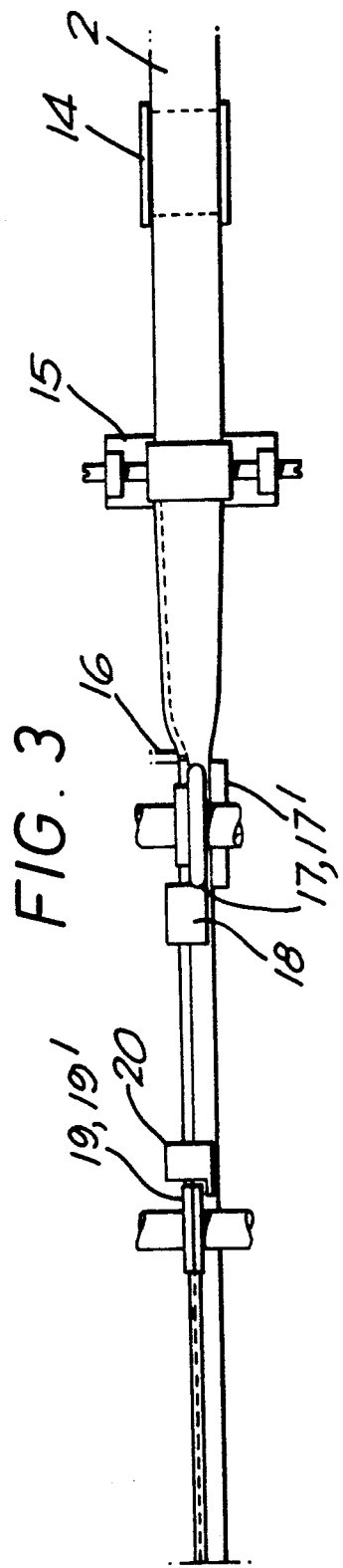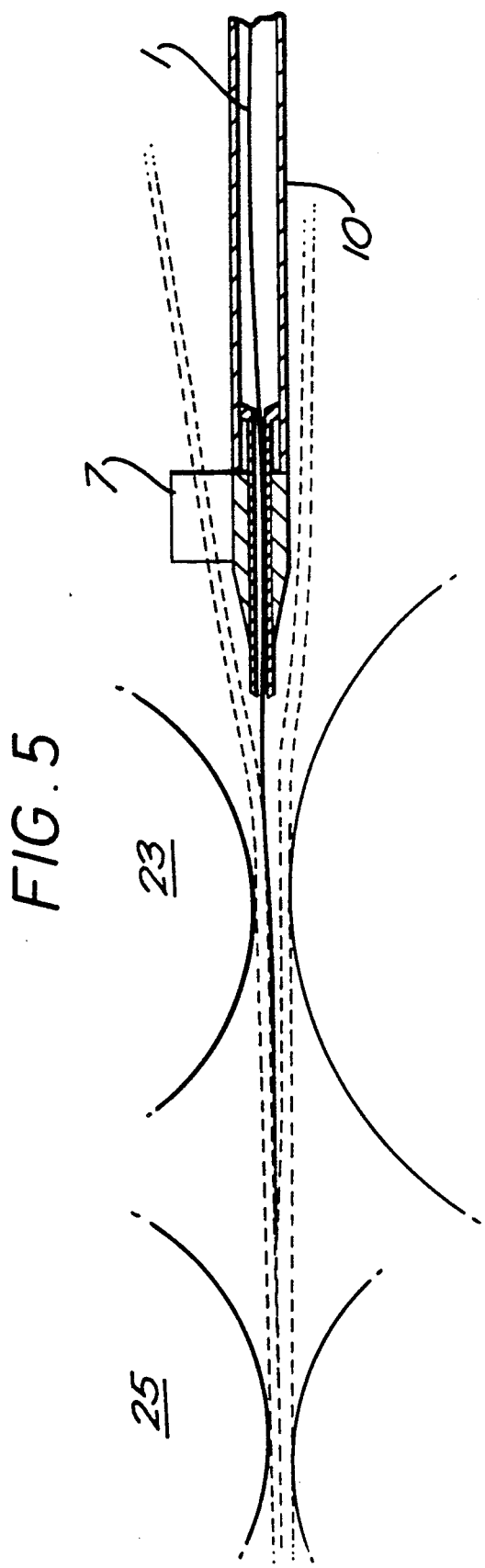

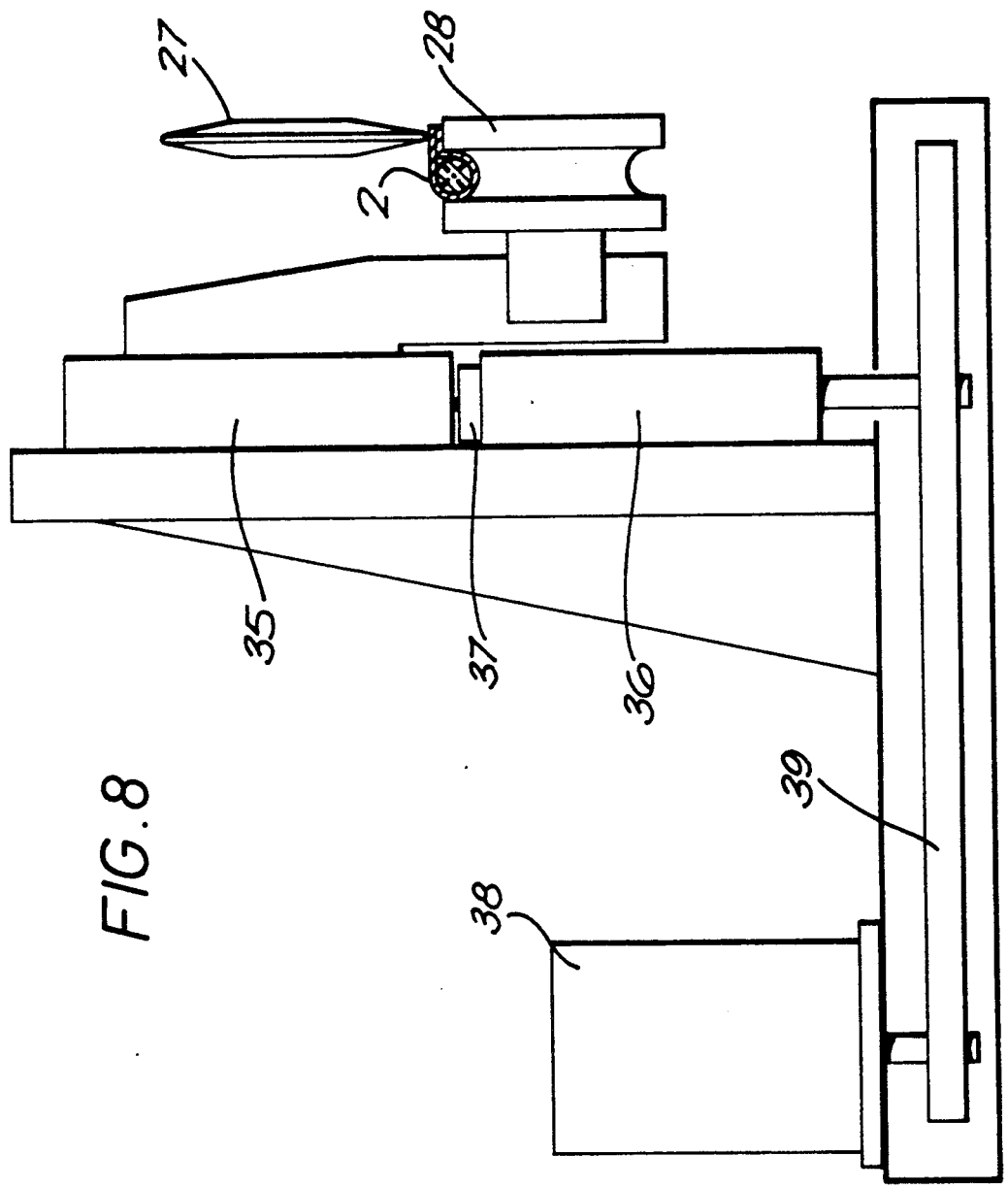

MANUFACTURE OF METAL TUBES

The invention relates to an apparatus and method for manufacturing elongate metal tubes and particularly, but not exclusively, to manufacturing tubular copper sheathing for cables.

An apparatus is known for forming bonds between materials which utilises the friction generated by high speed relative movement between a friction tool and the materials to be bonded to form the bond between the materials, and is described in British Patent Specification No. 1224891.

It has been found however, that for forming bonds between parts made of certain metals such as copper, it is difficult to achieve a satisfactory bond for some applications between the two metal parts using the known process described above. The present applicants have found it necessary to insert a brazing wire between the two metal parts to be bonded. A satisfactory bond is however only achieved if the brazing wire is correctly aligned between the two metal parts with the friction tool. The present invention seeks to achieve accurate alignment of the brazing wire.

The present invention provides an apparatus for manufacturing an elongate metal tube comprising forming means for forming an elongate metal strip into a shape which defines a tube, supplying means for supplying a brazing wire onto an edge portion of the metal strip prior to the completion of the formation of the metal strip into the shape defining a tube, means for aligning the brazing wire adjacent to and substantially parallel to the free edge of said edge portion such that the brazing wire becomes sandwiched between said edge portion and the edge portion of the metal strip opposed thereto, frictional means for forming a bond between said two edge portions at the location of the brazing wire, and means for causing longitudinal relative movement between said frictional means and the metal strip.

The means for aligning the brazing wire may comprise an adjustable guide tube adapted to be arranged adjacent the metal strip for aligning the brazing wire substantially immediately before the completion of the formation of the metal strip into a shape defining a tube.

The supplying means may further comprise straightening means for straightening the brazing wire.

The straightening means may comprise a plurality of rollers adapted to receive the brazing wire therethrough.

The straightening means may be adapted to be at least intermittently apply radial pressure to the brazing wire in order to at least partially flatten the brazing wire.

The apparatus may further comprise means for forming a groove to accommodate the brazing wire in an edge portion of the metal strip.

The means for forming a groove may comprise a pair of rollers.

The apparatus may further comprise means for aligning an elongate object to be housed in the metal tube with the metal strip prior to the completion of the formation of the metal strip into the shape defining a tube.

The means for aligning an elongate object in the tube may comprise guide rail means.

The forming means may comprise a combination of rollers and die means.

The frictional means may comprise a wheel adapted to rotate at high speed.

The means for causing longitudinal relative movement between said frictional means and the metal strip may comprise means for feeding the metal strip past a frictional means whose rotational axis is stationary.

The means for feeding the metal strip may comprise a plurality of rollers.

The apparatus may be adapted to continuously form a metal strip into a shape defining a tube and moving the edge portions thereof longitudinally past said frictional means.

The apparatus may further comprise detecting means for detecting the absence of or an insufficient tension in the brazing wire and/or metal strip and switching means for switching off in response to a signal from said detecting means the means for feeding the metal strip and/or the frictional means in the event of such an absence of or insufficient tension in the brazing wire and/or metal strip.

The detecting means may comprise a respective roller resting on the brazing wire and/or metal strip and adapted to move downwards in the absence of sufficient tension in the brazing wire and/or metal strip to actuate said switching means.

The forming means may be adapted to form the metal strip into the shape defining the tube such that the two edge portions to be bonded together have faces opposing each other which are part of the same surface of the metal strip.

The forming means may be such that on completion of the formation of the metal strip into the shape defining the tube, said edge portions protrude from the periphery of the tube, and the apparatus may further comprise means for folding said edge portions subsequently to bonding against the periphery of the tube.

The invention also provides a method of manufacturing an elongate metal tube comprising the steps of forming an elongate metal strip into a shape which defines a tube, supplying a brazing wire onto an edge portion of said metal strip prior to the completion of the formation of said metal strip into said shape, aligning said brazing wire adjacent to and substantially parallel to the free edge of said edge portion such that said brazing wire becomes sandwiched between said edge portion and the edge portion of the metal strip opposed thereto, and causing relative longitudinal movement between a frictional means and said metal strip at the location of the brazing wire to form a bond between said two edge portions.

The brazing wire may be so aligned substantially immediately before the completion of the formation of said metal strip into said shape.

The method may further comprise the step of straightening said brazing wire before aligning the brazing wire on said edge portion.

The method may further comprise the step of at least partially flattening the brazing wire.

The method may further comprise the step of forming a groove to accommodate said brazing wire in the edge portion of the metal strip.

The method may further comprise the step of aligning an elongate object to be housed in the metal tube with said metal strip prior to the completion of the formation of the metal strip into said shape.

The metal strip may be continuously formed into said shape and said edge portion may be moved longitudinally past said frictional means.

The method may further comprise the step of detecting the absence of or an insufficient tension in said brazing wire and/or metal strip and ceasing the manufacturing process in response to such an absence or insufficient tension being detected.

The metal strip may be formed into said shape such that the two edge portions to be bonded together have faces opposing each other which are part of the same surface of the metal strip.

On completion of the formation of the metal strip into said shape, the edge portions may protrude from the periphery of the tube and be subsequently to bonding folded against said periphery.

In order that the invention may be well understood, a preferred embodiment thereof will now be described in detail below, by way of example only, with reference to the accompanying drawings, in which:

FIG. 1 is a schematic elevational view of part of a metal tube manufacturing apparatus embodying the present invention;

FIG. 2 is a schematic elevational view of the remaining part of the metal tube manufacturing apparatus;

FIG. 3 is a plan view of the part of the apparatus shown in FIG. 1;

FIG. 4 is a plan view of the part of the apparatus shown in FIG. 2;

FIG. 5 is a detail of FIG. 2 to an enlarged scale;

FIG. 8 is an enlarged detailed view taken along the line VIII—VIII in FIG. 2, with some parts omitted;

Figure 10:
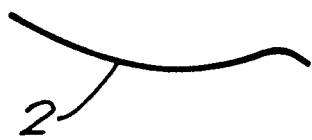
Figure 11:
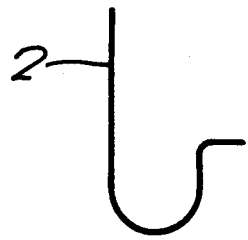
Figure 12:
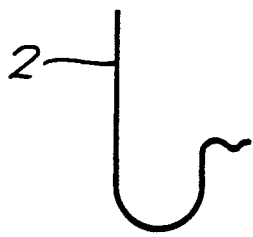
Figure 13:
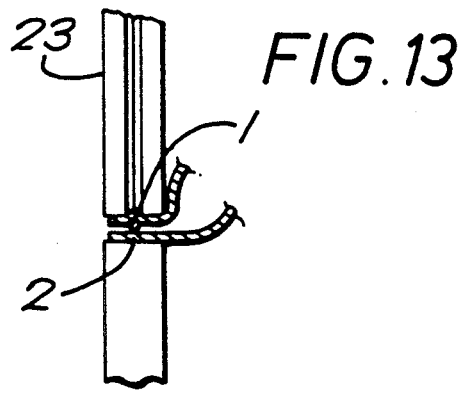
Figure 14:
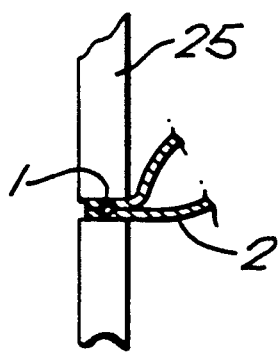
Figure 15:
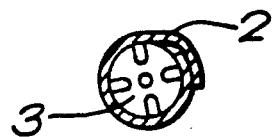

FIGS. 10 to 12 respectively are enlarged cross-sectional views of a metal strip at various stages of a tube manufacturing process using the apparatus;

FIG. 13 is an enlarged cross-sectional elevational view of the edge portions of a metal strip and a brazing wire between the first fin pinching rollers of the apparatus;

FIG. 14 is an enlarged cross-sectional elevational view of the edge portions of a metal strip and a brazing wire between the second fin pinching rollers of the apparatus; and FIG. 15 is an enlarged cross-sectional elevational view of a cable on completion of a tube manufacturing process using the apparatus.

Referring now to FIGS. 1 and 2, a metal tube manufacturing apparatus is shown which in the present case is used to manufacture copper sheathing for cables. The apparatus comprises forming means 15, 17, 17', 23, 24 for forming an elongate metal strip 2 into a shape which defines a tube, supplying means 4, 5, 6, 8, 9 for supplying a brazing wire 1 onto the metal strip 2 prior to the completion of the formation of the metal strip 2 into the shape defining a tube and means 7, which in the present embodiment includes an adjustable guide tube 10, for aligning the brazing wire 1 adjacent to and substantially parallel to the free edge of an edge portion of the metal strip 2 such that the brazing wire becomes sandwiched between the edge portion and the edge portion of the metal strip 2 opposed thereto. The apparatus also comprises a frictional means 27, which in the present embodiment comprises a wheel adapted to rotate at high speed, for forming a bond between the two edge portions, and means 28 for causing longitudinal relative movement between the frictional means 27 and the metal strip 2. In the present embodiment, the means 28 for causing longitudinal relative movement includes a brazing anvil 28 for feeding the metal strip 2 past a frictional means 27 whose rotational axis is stationary, and this function may also be assisted by the forming means 15, 17, 17', 23, 24.

Figure 6:
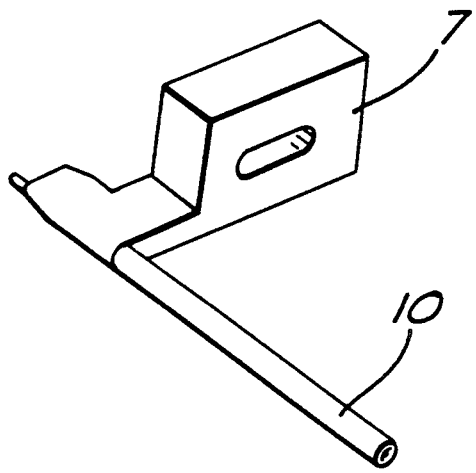
FIG. 6 is an enlarged perspective view of the brazing wire aligning means of the apparatus.
Figure 7:
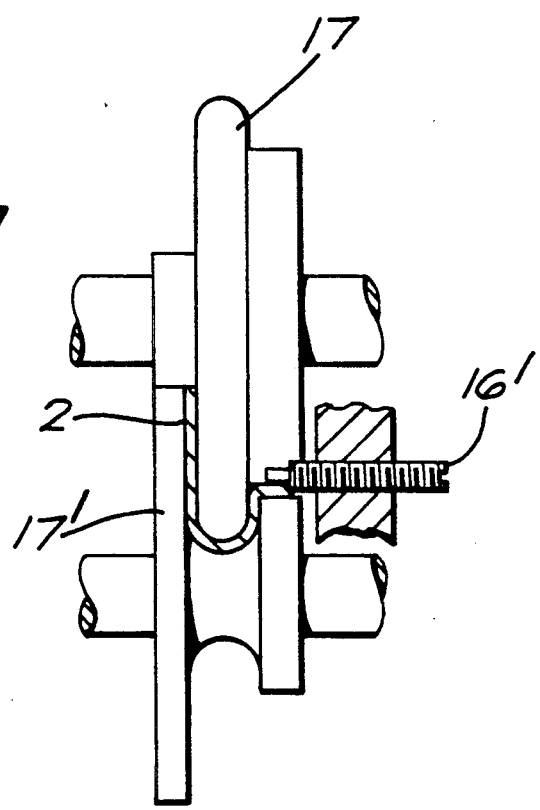
FIG. 7 is an enlarged cross-sectional elevational view of a set of forming rollers of the apparatus.
Figure 9:
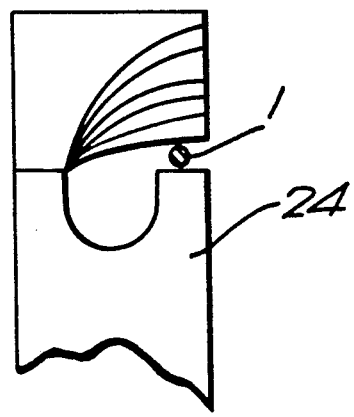
FIG. 9 is an enlarged view taken along the line IX—IX in FIG. 2.

A copper strip 2 passes through the apparatus from right to left as viewed in FIGS. 1 and 2. At the same time, a brazing wire 1 is supplied from a spool 4 which has an adjustable friction brake to control the tension in the wire 1, which is preferably a silver/copper/phosphorous alloy in the proportions Ag 15: Cu80: P5, although any suitable alternative composition may be used. The wire 1 then passes around a guide 9 and into a straightening means 5 which comprises a set of straightening rollers which are mounted with their axes parallel, and then under a detecting means 6 comprising a weighted roller whose function will be described later. The first and last of the straightening rollers 5 each have a circumferential groove at a position midway along their axes, the grooves serving to align the brazing wire 1 before it passes through the supplying rollers 8, of which in the present case there are two. The straightening rollers 5 are adjusted so that each successive pair of rollers progressively nips the wire 1 which then emerges from the rollers 5 substantially straighter but with small flat portions on its upper and lower surfaces. These help to maintain alignment of the wire 1 as it passes through the rollers 8, and make the wire 1 stiffer in the horizontal plane than in the vertical plane. At the same time as the brazing wire 1 is supplied to the supplying rollers 8, the copper strip 2 passes over guide roller 14 and through the forming die 15, which performs part of the function of forming the metal strip 2 into a tubular shape and is also shown in FIG. 3. The forming die 15 consists of two matched adjustable parts which preform the strip 2 into a section of about 90° of circular arc having one edge turned slightly downwards, as shown in cross-section in FIG. 10. This preforming facilitates further forming of the strip 2 by a pair of rollers 17, 17, into a finned U-shape which is shown in cross-section in FIGS. 7 and 11. The adjustable screw 16 shown in FIGS. 3 and 7 locates the edge of the strip 2 before it is formed into a finned U-shape by the rollers 17, 17', as is shown in more detail in cross-section in FIG. 7, the edge portion located by the screw 16 forming the fin of the finned U-shape. A guide block 18 having a profile matching the inner profile of the finned U-shape then aligns the strip 2 as it exits from the rollers 17, 17'. The size and uniformity of the fin are varied by adjustment of the guide block 18 and/or screw 16.

The strip 2 then passes through a guide block 20 and a means 19, 19' for forming a groove in the strip 2 to accommodate the brazing wire, the means 19, 19' in the present embodiment comprising a pair of rollers. The guide block 20 is similar in construction to the guide block 18 and is positioned so that it holds the short side of the U-shape and the fin securely against the lower forming roller 19. The rollers 19, 19' then form a groove in the edge portion of the strip 2 adjacent to and substantially parallel to its free edge, as can be seen in cross-section in FIG. 12. The groove serves to accommodate the brazing wire 1 in the edge portion of the metal strip 2.

The strip 2 then passes through means 21 for aligning with the strip 2 an elongate object 3, which in the present case is the cable core, which is to be housed in the metal tube. The means 21 comprises two brass guide rails which have concave bearing surfaces to locate the cable core 3 and lay it directly onto the bottom of the finned U-shape. The strip 2 carrying the cable core 3 then passes into a U-channel guide block 22, which is preferably made of solid nylon, and at the same time, the supplying rollers 8 feed the brazing wire 1 into the U-channel block 22 and subsequently into the brazing wire guide means 7 which aligns the brazing wire 1 in the groove in the lower fin. As the strip 2 exits the U-channel guide 22, an adjustable guide 24 folds the high side of the finned U-shape over and across the top of the cable core 3 to almost complete the formation of the shape defining tube such that the high side of the finned U becomes the upper of the two edge portions of the strip 2 to be bonded together. The brazing wire 1 in the groove becomes sandwiched between these two edge portions.

The metal strip 2 containing the cable core 3 and having the brazing wire 1 sandwiched between its fins then passes through first fin-pinching rollers 23, in the lower one of which is a groove which locates the notch in the upper fin caused by the brazing wire 1, as can be seen from FIG. 13. The brazing wire guide tube 7 is preferably located as near as possible to the first fin-pinching rollers 23, so that the fins are pinched together before the brazing wire 1 can become dislodged from the groove in the fin. Second fin-pinching rolls 25 then apply sufficient load to the fins to embed the brazing wire 1 in the now tubular metal strip 2 such that the top of the upper fin and bottom of the lower fin emerge from the rolls 25 substantially flat as is shown in detail in FIG. 14. In the present embodiment, both sets of rolls 23, 25 have fixed bottom rolls and cam-adjustable top rolls so that the pinching pressure on the fins can be varied.

The tubular metal strip 2 then passes under a pressure pad 26 which ensures that the brazing wire remains in place by keeping the fins pressed firmly together, and the cable sheath 2 containing the core 3 then passes under the frictional means 27, which in the present case is a wheel adapted to spin rapidly. The wheel is preferably made of hot worked steel and is driven at a speed of about 25000 rpm. The cable sheath 2 is carried beneath the wheel 27 by a brazing anvil 28 which consists of a grooved roller on a cantilevered shaft, as shown more clearly in FIG. 8. The bulk of the cable lies in the groove of the anvil 28 and the fins are supported on a flat surface adjacent to the groove. The amount of contact between the wheel 27 and the fin is controlled by vertical movement of the brazing anvil 28 by means of a stepper motor 38, a belt 39 and two slides 35, 36, on the upper 35 of which the anvil 28 is mounted through a button-type load cell 37. In order to reduce the temperature of the sheath 2 during brazing, the anvil 28 is water cooled and the wheel 27 is cooled by means of cold air provided by passing compressed air through a vortex tube 30, the air then being directed via the wheel guard 29 onto the periphery of the wheel 27. The process is also monitored in the present case by focusing an infra-red thermometer 31 or any other suitable means, onto the track left by the wheel 27.

The bonded sheath 2 then passes under a flat roller 32, which helps to prevent the sheath from twisting in the brazing anvil 28, and then passes through an anti-twist guide block 33 and a fin-closing die 34. The fin-closing die 34 is in the present embodiment made of steel and water cooled. It folds the still protruding fins against the periphery of the sheath 2 so that the sheath 2 has the cross-section shown in FIG. 15.

The weighted roller 6 shown in FIG. 1 forms a detecting means for detecting the absence of or insufficient tension in the brazing wire 1 and is mounted on an arm about a pivot. If the tension in the brazing wire 1 is sufficient, the weighted roller 6 is maintained in the condition shown in FIG. 1. If the tension in the wire 1 becomes too low, or if there is no more brazing wire 1, however, the weighted roller 6 pivots downwards on the arm and operates a switching means 11 for switching off the moving parts of the apparatus. A similar detecting and switching arrangement may be included to detect the absence of or too low a tension in the copper strip 2 and to shut down the moving parts of the apparatus in response to such a detection, though such an additional arrangement is not shown in the figures.

It will be appreciated that the present invention is not limited in scope to the embodiment or use described above. In particular, an alternative construction of the frictional means may be used, i.e. not using wheels, or the apparatus, instead of receiving a copper strip and brazing wire at one end and continuously delivering manufactured metal tubing with cable core therein at the other end, may be an apparatus which moves along a copper strip which is fixed in position. Furthermore, instead of using detecting means in the form of weighted rollers, optical or any other suitable detectors may be used.

Additionally, whilst the formation of the edge portions to be bonded into a fin arrangement as shown in FIG. 15 is preferred, they may alternatively be simply overlapped in a wrap-around arrangement if the materials of the metal strip or the contents of the tube provide sufficient support during manufacture.

We claim:

1. An apparatus for manufacturing an elongate metal tube comprising forming means for forming an elongate metal strip into a shape which defines a tube, supplying means for supplying a brazing wire onto an edge portion of the metal strip prior to the completion of the formation of the metal strip into the shape defining a tube, means for aligning the brazing wire adjacent to and substantially parallel to the free edge of said edge portion such that the brazing wire becomes sandwiched between said edge portion and the edge portion of the metal strip opposed thereto, frictional means for forming a bond between said two edge portions at the location of the brazing wire, and means for causing longitudinal relative movement between said frictional means and the metal strip.

2. An apparatus according to claim 1, wherein said means for aligning the brazing wire comprises an adjustable guide tube adapted to be arranged adjacent the metal strip for aligning the brazing wire substantially immediately before the completion of the formation of the metal strip into a shape defining a tube.

3. An apparatus according to claim 1 or 2, wherein said supplying means further comprises straightening means for straightening the brazing wire.

4. An apparatus according to claim 3, wherein said straightening means comprises a plurality of rollers adapted to receive the brazing wire therethrough.

5. An apparatus according to claim 4, wherein said straightening means is adapted to at least intermittently apply radial pressure to the brazing wire in order to at least partially flatten the brazing wire.

6. An apparatus according to claim 1, further comprising means for forming a groove to accommodate the brazing wire in an edge portion of the metal strip.

7. An apparatus according to claim 6, wherein said means for forming a groove comprises a pair of rollers.

8. An apparatus according to claim 1, further comprising means for aligning an elongate object to be housed in the metal tube with the metal strip prior to the completion of the formation of the metal strip into the shape defining a tube.

9. An apparatus according to claim 8, wherein said means for aligning an elongate object in the tube comprises guide rail means.

10. An apparatus according to claim 1, wherein said forming means comprises a combination of rollers and die means.

11. An apparatus according to claim 1, wherein said frictional means comprises a wheel adapted to rotate at high speed.

12. An apparatus according to claim 1, wherein said means for causing longitudinal relative movement between said frictional means and the metal strip comprises means for feeding the metal strip past a frictional means whose rotational axis is stationary.

13. An apparatus according to claim 12, wherein said means for feeding the metal strip comprises a plurality of rollers.

14. An apparatus according to claim 12 or 13, wherein the apparatus is adapted to continuously form a metal strip into a shape defining a tube and moving the edge portions thereof longitudinally past said frictional means.

15. An apparatus according to claim 14, further comprising detecting means for detecting the absence of or an insufficient tension in the brazing wire and/or metal strip and switching means for switching off in response to a signal from said detecting means the means for feeding the metal strip and/or the frictional means in the event of such an absence of or insufficient tension in the brazing wire and/or metal strip.

16. An apparatus according to claim 15, wherein said detecting means comprises a respective roller resting on the brazing wire and/or metal strip and adapted to move downwards in the absence of sufficient tension in the brazing wire and/or metal strip to actuate said switching means.

17. An apparatus according to claim 1, wherein said forming means is adapted to form the metal strip into the shape defining the tube such that the two edge portions to be bonded together have faces opposing each other which are part of the same surface of the metal strip.

18. An apparatus according to claim 17, wherein the forming means are such that on completion of the formation of the metal strip into the shape defining the tube, said edge portions protrude from the periphery of the tube, and the apparatus further comprises means for folding said edge portions subsequently to bonding against the periphery of the tube.

19. A method of manufacturing an elongate metal tube comprising the steps of forming an elongate metal strip into a shape which defines a tube, supplying a brazing wire onto an edge portion of said metal strip prior to the completion of the formation of said metal strip into said shape, aligning said brazing wire adjacent to and substantially parallel to the free edge of said edge portion such that said brazing wire becomes sandwiched between said edge portion and the edge portion of the metal strip opposed thereto, and causing relative longitudinal movement between a frictional means and said metal strip at the location of the brazing wire to form a bond between said two edge portions.

20. A method according to claim 19, wherein said brazing wire is so aligned substantially immediately before the completion of the formation of said metal strip into said shape.

21. A method according to claim 19 or 20, further comprising the step of straightening said brazing wire before aligning the brazing wire on said edge portion.

22. A method according to claim 21, further comprising the step of at least partially flattening said brazing wire.

23. A method according to claim 19, further comprising the step of forming a groove to accommodate said brazing wire in the edge portion of the metal strip.

24. A method according to claim 19, further comprising the step of aligning an elongate object to be housed in the metal tube with said metal strip prior to the completion of the formation of the metal strip into said shape.

25. A method according to claim 19, wherein said metal strip is continuously formed into said shape and said edge portions are moved longitudinally past said frictional means.

26. A method according to claim 25, further comprising the step of detecting the absence of or an insufficient tension in said brazing wire and/or metal strip and ceasing the manufacturing process in response to such an absence or insufficient tension being detected.

27. A method according to claim 19, wherein said metal strip is formed into said shape such that the two edge portions to be bonded together have faces opposing each other which are part of the same surface of the metal strip.

28. A method according to claim 27, wherein on completion of the formation of the metal strip into said shape, said edge portions protrude from the periphery of the tube and are subsequently to bonding folded against said periphery.

* * * * *